United States Patent
De Haan et al.

[11] Patent Number: 5,534,946
[45] Date of Patent: Jul. 9, 1996

[54] APPARATUS FOR PERFORMING MOTION-COMPENSATED PICTURE SIGNAL INTERPOLATION

[75] Inventors: Gerard De Haan; Paul W. A. C. Biezen; Olukayode A. Ojo; Hendrik Huijgen, all of Eindhoven, Netherlands

[73] Assignee: U.S. Philips Corporation, New York, N.Y.

[21] Appl. No.: 333,904

[22] Filed: Nov. 3, 1994

Related U.S. Application Data

[63] Continuation of Ser. No. 57,359, May 5, 1993.

[30] Foreign Application Priority Data

May 15, 1992 [EP] European Pat. Off. .............. 92201388

[51] Int. Cl.$^6$ ..................................... H04N 5/44
[52] U.S. Cl. .................... 348/619; 348/452; 348/620; 348/699
[58] Field of Search ..................... 348/452, 413, 348/416, 699, 700, 443, 452, 619, 620

[56] References Cited

U.S. PATENT DOCUMENTS

| | | | |
|---|---|---|---|
| 4,771,331 | 9/1988 | Bierling et al. | 358/163 |
| 5,072,293 | 12/1991 | De Haan et al. | |
| 5,081,532 | 1/1992 | Rafii | 348/700 X |
| 5,101,273 | 3/1992 | Gillies et al. | 358/140 |
| 5,424,779 | 6/1995 | Odaka et al. | 348/416 |

FOREIGN PATENT DOCUMENTS 0474287  6/1991  European Pat. Off. ......... H04N 5/44

OTHER PUBLICATIONS

Berkhoff et al., "Applications of Picture Memories in Television Receiver", IEEE Trans. Consum. Electron., vol. CE-29, pp. 251–254, 256–258, 1985.

751290 U.S. Application Aug. 29, 1991.

*Primary Examiner*—Victor R. Kostak
*Assistant Examiner*—Nathan J. Flynn
*Attorney, Agent, or Firm*—Michael E. Marion

[57] ABSTRACT

In a motion-compensated picture signal interpolation apparatus comprising switched memories (SMX,LM) for furnishing motion-compensated pixel values corresponding to at least two motion vectors (±d, 0), the motion-compensated pixel values are processed by an ordered statistical filter (MED).

9 Claims, 1 Drawing Sheet

| 1: | A | B | C | D | E | F |
|---|---|---|---|---|---|---|
| 2: | Z | A A | B B | C C | D D | E E |
| 3: | Y | Z Z | A A | B B | C C | D D |
| 4: | YZ | Z ZA | A AB | B BC | C CD | D DE |

APPARATUS FOR PERFORMING MOTION-COMPENSATED PICTURE SIGNAL INTERPOLATION

This is a continuation of application Ser. No. 08/057,359 filed May 5, 1993.

BACKGROUND OF THE INVENTION

The invention relates to a motion-compensated picture signal interpolation apparatus which may be used to create additional lines or fields for improving the display quality of a picture signal. The invention further relates to a television signal receiver comprising such an interpolation apparatus.

European Patent Application EP-A-0,474,287 (U.S. Ser. No. 751,290, filed Aug. 29, 1991, allowed) (PHN 13,443) describes a line number doubler in which a median filter reduces artifacts in an interpolated line obtained by motion-compensated interpolation using a single motion vector per pixel or per block of pixels.

When very complex and fast movements in the image cannot be estimated correctly, for example, because they are outside the estimator range or because the velocity field is very inconsistent, estimated motion vectors are incorrect and a motion-compensated interpolation based on these motion vectors yields erroneous results. Subjectively, artifacts arising from such incorrect motion vectors are very disturbing at transients and in the neighborhood of stationary objects, since they tend to be concentrated in an isolated, conspicuous spot on the screen, especially when there is high spatial detail.

SUMMARY OF THE INVENTION

It is, inter alia, an object of the invention to provide a way of making any degradations look more natural and elegant.

For this purpose, a first aspect of the invention provides a motion-compensated picture signal interpolation apparatus as defined in claim 1. Advantageous embodiments are defined in the subclaims. A second aspect of the invention provides a television signal receiver as defined in claim 4.

The invention thus proposes to use more than one motion vector for motion-compensated interpolation, and to combine the pixel values corresponding to the motion vectors by means of an ordered statistical filtering. Consequently, there is blurring in areas for which different, i.e. unreliable motion vectors are determined. The blurring thus obtained is, however, more attractive than the unnatural, pronounced discontinuity which results from the use of one erroneous motion vector.

The at least two motion vectors referred to in the main claim may include the zero motion vector. They may have been obtained by means of, for example, a phase plane correlation motion estimator which furnishes a plurality of motion vectors corresponding to correlation peaks, or by means of the motion estimator described in EP-A-0,415,491 (PHN 13,068) which furnishes a plurality of candidate motion vectors. In contradistinction to these prior art motion estimators and in accordance with the present invention, the motion estimator does not furnish only one selected output vector, but a plurality of motion vectors which are used in an ordered statistical filtering. The motion-compensated pixel values corresponding to the at least two motion vectors may include pixel values indicated by the motion vectors, filtered pixel values (for example, averages of the pixel values indicated by both ends of the motion vector), or both.

Together with the pixel values indicated by the motion vectors, neighboring pixel values may be applied to the ordered statistical filter to improve the accuracy. An ordered statistical filter arranges its input values with an increasing (or decreasing, if desired) magnitude, and multiplies the rearranged input values by corresponding weighting coefficients. The sum of the weighting coefficients may equal one and the weighting coefficients may have symmetrical values: the last coefficient equals the first coefficient, the last-but-one coefficient equals the second coefficient, etc. The ordered statistical filter preferably includes a simple median filter, but other ordered statistical filters are alternatively possible. In a median filter, the middle coefficient equals one, while the other coefficients are zero.

Good interpolation results were obtained by the apparatus defined in claim 3.

These and other aspects of the invention will be apparent from and elucidated with reference to the embodiments described hereinafter.

DETAILED DESCRIPTION OF THE PREFERRED EMBODIMENTS OF THE INVENTION

Figures 1, 2:
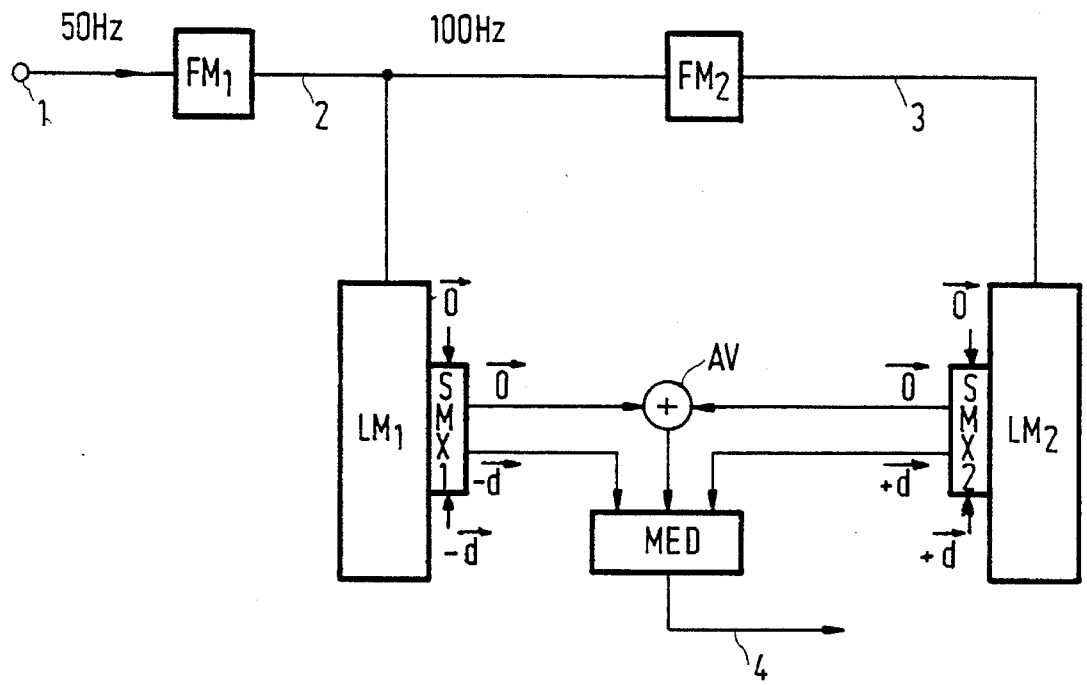
FIG. 1 shows an embodiment of a television signal receiver comprising a motion-compensated interpolator in accordance with the present invention.
FIG. 2 shows a time diagram of successive fields at several places in the embodiment of FIG. 1.

In the embodiment shown in FIG. 1, a picture signal, whose field rate is 50 Hz, is applied to a first field memory FM1. In FIG. 2, line 1 shows a time diagram of the incoming field sequence A, B, C, D, E, F of the picture signal. By means of the field memory FM1, the field ram of the picture signal is doubled by reading each field of the picture signal twice from the first field memory FM1. In FIG. 2, line 2 shows a time diagram of the field sequence supplied by the field memory FM1. This sequence is applied to a second field memory FM2, which writes each second occurrence of each field applied to it, while the second field memory FM2 ignores the first time when a field is applied to it. Each field which has been written into the second field memory FM2, is read twice from the second field memory FM2. In FIG. 2, line 3 shows a time diagram of the field sequence supplied by the second field memory FM2. Finally, line 4 of FIG. 2 shows a time diagram of the output field sequence of the motion-compensated picture signal interpolation apparatus of FIG. 1, in which AB indicates an interpolated field based on input fields A and B, etc.

The embodiment of FIG. 1 further comprises two line memory sections LM1, LM2, each comprising a tapped delay line of, for example, 5 line memories and 16 pixel memories per line memory tap, so that each pixel in a given area can be reached through switch matrices SMX1, SMX2. The switch matrices SMX1, SMX2 are controlled by motion vectors 0, +d and −d.

An averager AV receives two pixel values which have not been shifted by a motion vector from the line memory sections LM1, LM2; in other words, they have been shifted by the zero motion vector 0. A median filter MED receives the output of the averager AV, a pixel value from the line memory section LM1 shifted over a motion vector −d, and a pixel value from the line memory section LM2 shifted over a motion vector +d. The median filter MED furnishes the interpolated fields YZ, ZA, AB etc. shown in line 4 of FIG. 2.

It should be noted that the above-mentioned embodiment illustrates rather than limits the invention as, for example, any other more complicated ordered statistical filter may replace the median filter shown, and that those skilled in the art will be able to design many alternative embodiments, all falling within the scope of the appended claims.

We claim:

1. A motion-compensated picture signal interpolation apparatus for generating an interpolated field of pixels intermediate a first and a second field of pixels, comprising:

means for furnishing at least first and second motion vectors relating said first and second fields of pixels;

means for furnishing a first field of motion-compensated pixel values corresponding to said first motion vector and a second field of motion-compensated pixel values corresponding to said second motion vector; and means for ordered statistical filtering of corresponding motion-compensated pixel values in said first and second fields to produce an interpolated field of pixels.

2. A motion-compensated picture signal interpolation apparatus, comprising:

means for furnishing at least two motion vectors;

means for furnishing motion-compensated pixel values corresponding to said at least two motion vectors; and means for ordered statistical filtering of said motion-compensated pixel values, wherein said ordered statistical filtering means include a median filter.

3. A motion-compensated picture signal interpolation apparatus, comprising:

means for furnishing at least two motion vectors;

means for furnishing motion-compensated pixel values corresponding to said at least two motion vectors; and means for ordered statistical filtering of said motion-compensated pixel values, wherein said ordered statistical filtering means includes a median filter, and wherein said median filter is coupled to receive two pixel values from two different fields, which values correspond to a first motion vector and an average pixel value which corresponds to a zero motion vector.

4. A television signal receiver, comprising:

receiving means coupled to receive said television signal; and a motion-compensated picture signal interpolation apparatus coupled to said receiving means for providing an interpolated field of pixels intermediate a first and a second field of pixels, wherein said interpolation apparatus includes:

means for furnishing at least first and second motion vectors relating said first and second fields of pixels;

means for furnishing a first field of motion-compensated pixel values corresponding to said first motion vector and a second field of motion-compensated pixel values corresponding to said second motion vector; and means for ordered statistical filtering of corresponding motion-compensated pixel values in said first and second fields to produce an interpolated field of pixels.

5. A motion-compensated picture signal interpolation apparatus, comprising:

means for furnishing a motion vector relating pixels in a first field to pixels in a second field;

means for determining first possible pixel values for an intermediate field between said first and second fields as motion-compensated pixels derived from said motion vector and said pixels in said first field and for determining second possible pixel values for said intermediate field as motion-compensated pixels derived from said motion vector and said pixels in said second field;

means for determining third possible pixel values for said intermediate field as average pixel values derived from corresponding pixels in said first and second fields; and means for ordered statistical filtering of said first, second and third possible pixel values to produce interpolated pixel values for said intermediate field.

6. A motion-compensated picture signal interpolation apparatus as defined in claim 5 wherein said ordered statistical filtering means includes a median filter.

7. A motion-compensated picture signal interpolation apparatus, comprising:

means for furnishing at least first and second motion vectors relating pixels in a first field to pixels in a second field;

means for determining first possible pixel values for an intermediate field between said first and second fields as motion-compensated pixels derived from said first motion vector and for determining second possible pixel values for said intermediate field as motion-compensated pixels derived from said second motion vector; and means for producing interpolated pixel values for said intermediate field from said first and second possible pixel values.

8. A motion-compensated picture signal interpolation apparatus as defined in claim 7 wherein said means for producing interpolated pixel values for said intermediate field includes an ordered statistical filter.

9. A motion-compensated picture signal interpolation apparatus as defined in claim 7 wherein said means for producing interpolated pixel values for said intermediate field includes a median filter.

\* \* \* \* \*